(12) United States Patent
Lippert et al.

(10) Patent No.: US 6,691,119 B1
(45) Date of Patent: Feb. 10, 2004

(54) TRANSLATING PROPERTY NAMES AND NAME SPACE NAMES ACCORDING TO DIFFERENT NAMING SCHEMES

(75) Inventors: Lisa M. Lippert, Seattle, WA (US); Joel M. Soderberg, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/361,092

(22) Filed: Jul. 26, 1999

(51) Int. Cl.$^7$ ............................................. G06F 17/00
(52) U.S. Cl. ........................ 707/100; 707/10; 707/101; 709/218; 717/115; 715/513
(58) Field of Search .................. 707/10, 101, 102; 709/217–219, 201, 202, 203; 717/115; 715/513

(56) References Cited

U.S. PATENT DOCUMENTS

| | | | | | |
|---|---|---|---|---|---|
| 5,890,171 | A | * | 3/1999 | Blumer et al. ........... | 715/501.1 |
| 6,061,697 | A | * | 5/2000 | Nakao ........................ | 715/513 |
| 6,263,332 | B1 | * | 7/2001 | Nasr et al. ...................... | 707/5 |
| 6,269,380 | B1 | * | 7/2001 | Terry et al. ................... | 707/200 |
| 6,308,179 | B1 | * | 10/2001 | Petersen et al. ............ | 707/102 |
| 6,324,551 | B1 | * | 11/2001 | Lamping et al. ............ | 715/500 |
| 6,377,952 | B1 | * | 4/2002 | Inohara et al. .............. | 707/101 |
| 6,424,979 | B1 | * | 7/2002 | Livingston et al. ......... | 715/511 |
| 6,446,256 | B1 | * | 9/2002 | Hyman et al. ............... | 717/143 |
| 6,470,306 | B1 | * | 10/2002 | Pringle et al. .................. | 704/3 |
| 6,476,833 | B1 | * | 11/2002 | Moshfeghi ................... | 345/854 |

FOREIGN PATENT DOCUMENTS

| | | | | | |
|---|---|---|---|---|---|
| GB | 2351369 | A | * | 12/2000 | ............. G06F/9/44 |
| GB | 2351573 | A | * | 1/2001 | ........... G06F/13/38 |

OTHER PUBLICATIONS

HTTP Working Group Internet Draft dated Nov. 18, 1998, prepared by Fielding, et al., available on the web site http://www.w3.org. [Chapter 1 is specifically provided].

W3C Recommendation REC–xml–1998–0210 dated Feb. 10, 1998, and available on the web site http://www.w3.org.

E. James Whitehead Jr., World–Wide–Web Distributed Authoring and Versioning (WebDAV): An Introduction, in StandardView, vol. 5, No. 1, Mar. 1997, pp. 3–8.

Internet Engineering Task Force (IETF) Request for Comment (RFC) 2518, entitled HTTP Extensions for Distributed Authoring, by Y. Goland, E. Whitehead, A. Faizi, S. Carter and D. Jensen, dated Feb. 1999.

ISO/IEC 9075:1992, Database Language SQL, Jul. 30, 1992, available from and produced by the International Organization for Standardization (ISO) in liason with the International Electrotechnical Commission (IEC), specifically the Joint Technical Committee ISO/IEC JTC2, Information Processing Systems. [Introduction is specifically provided].

Chris Date and Hugh Darwen, A Guide to the SQL Standard: A User's Guide to the Standard Database Language SQL, Apr. 1997, ISBN 0201964260.

(List continued on next page.)

*Primary Examiner*—Greta Robinson
*Assistant Examiner*—Miranda Le
(74) *Attorney, Agent, or Firm*—Workman Nydegger

(57) ABSTRACT

Translating property names and name space names between different naming schemes is disclosed. In one embodiment, a method receives a request including a header specifying a property and a name space. The header has a naming scheme in accordance with either a concatenated naming scheme, such as specified by WebDAV, or a separated naming scheme, such as specified by OLEDB. The method translates the header to the other naming scheme, and outputs the request.

29 Claims, 3 Drawing Sheets

OTHER PUBLICATIONS

Internet Web Site http://www.microsoft.com/data/oledb/, last update Mar. 17, 1999.

Internet Web Site http://www.microsoft.com/data/oledb/oledb20/, printed Jul. 23, 1999.

Internet Web Site http://www.microsoft.com/com/, printed Jul. 23, 1999.

Internet Web Site http://www.microsoft.com/com/about.asp, printed Jul. 23, 1999.

Network Working Group Request for Comment (RFC) 1738 entitled Uniform Resource Locators (URL), by T. Berners–Lee, L. Masinter, M. McCahill, dated Dec. 1994.

Network Working Group Request for Comment (RFC) 2396 entitled Uniform Resource Identifiers (URI): Generic Syntax, by T. Berners–Lee, R. Fielding, L. Masinter, dated Aug. 1998.

* cited by examiner

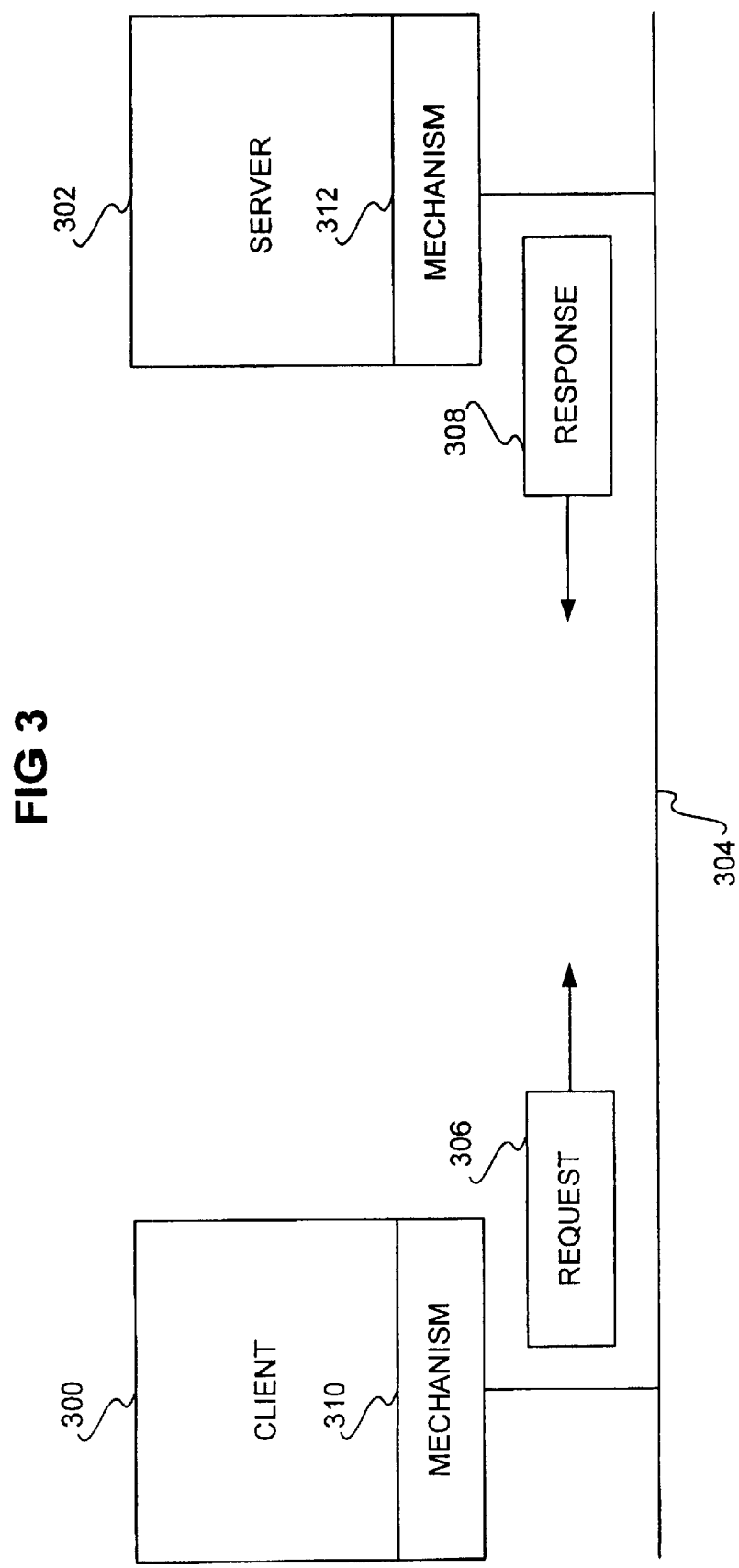

TRANSLATING PROPERTY NAMES AND NAME SPACE NAMES ACCORDING TO DIFFERENT NAMING SCHEMES

FIELD OF THE INVENTION

This invention relates generally to standard request-response protocols such as the HyperText Transport Protocol (HTTP), and more specifically to properties and name spaces of such protocols.

BACKGROUND OF THE INVENTION

The HyperText Transport Protocol (HTTP) has emerged as the standard mechanism by which information is transported over TCP/IP (Transmission Control Protocol/Internet Protocol) compatible networks, such as the Internet, intranets, and extranets. HTTP is more specifically an application-level protocol for distributed, collaborative, hypermedia information systems. It is a generic, stateless, protocol that can be used for many tasks beyond its use for hypertext, such as name servers and distributed object management systems, through extension of its request methods, error codes and headers. It is referred to as a transport protocol, since information is transported according to its specifications, and is also referred to as a request-response protocol, since information is exchanged by a client making a request of a server, which generates a response thereto. HTTP as referred to herein refers generally to any standard of HTTP, and specifically to HTTP/1.1, as described in the HTTP Working Group Internet Draft dated Nov. 18, 1998, prepared by Fielding, et al., and available on the web site //www.w3.org.

A common use of HTTP is the transport of information formatted according to a markup language. For example, a popular application of the Internet is the browsing of world-wide-web pages thereof. In such instances, typically the information retrieved is in HyperText Markup Language (HTML) format, as transported according to HTTP. However, other standard markup languages are emerging. One such markup language is eXtensible Markup Language (XML). XML describes a class of data objects that are referred to as XML documents, and partially describes the behavior of computer programs that process them. A primary difference between HTML and XML is that within the former, information content is intertwined with the layout of the content, making their separation difficult, for example. Conversely, within XML a description of the storage layout and logical structure of content is maintained separate from the content itself. However, both XML and HTML are subsets of a markup language known as Standard Generalized Markup Language (SGML). XML as referred to herein refers generally to any standard of XML, and specifically to XML 1.0, as described in the W3C recommendation REC-xml-19980210 dated Feb. 10, 1998, and also available on the web site //www.w3.org.

HTTP, and hence XML in the context of HTTP, allows for the access of resources. The term resource refers to any piece of information that has a location described by a Uniform Resource Locator (URL) of the form HTTP://<domain>.<extension>, where <domain> specifies a particular domain, and <extension> can be, for example, .com, .edu, and net, among others. A resource can be, for example, a Web page, a hierarchical collection of information such as folders, a document, a database, a bitmap image, or a computational object. Recently, extensions to HTTP have been proposed that, among other things, allow for better access to resources over HTTP. The extensions are generally referred to as the World-Wide-Web Distributed Authoring and Versioning (WebDAV) extensions to HTTP. The goal of WebDAV, broadly speaking, has been to add remote authoring capabilities to HTTP, so that HTTP can be more convenient as a readable and writable collaborative medium, and not necessarily only a browsing medium for web pages.

WebDAV is generally described in the reference E. James Whitehead, Jr., World-Wide-Web Distributed Authoring and Versioning (WebDAV): An Introduction, in StandardView, Vol. 5, No. 1, March 1997, pages 3–8. WEBDav is also described in the reference Internet Engineering Task Force (IETF) Request for Comment (RFC) 2518, entitled HTTP Extensions for Distributed Authoring, by Y. Goland, E. Whitehead, A. Faizi, S. Carter and D. Jensen, and dated February 1999. Generally, this latter reference specifies a set of methods, headers and content-types ancillary to HTTP/1.1 for the management of resource properties, creation and management of resource collections, name space manipulation, and resource locking (also referred to as collision avoidance).

The WebDAV extensions to HTTP specify that properties and name spaces be described according to a separate naming scheme wherein property names may not be unique, but are combined with a namespace in order to ensure uniqueness. A namespace may have a long name, thus may be abbreviated as in the format: <ns:property>, where ns: is the namespace abbreviation and property is the property name. A namespace abbreviation is associated with a namespace, for an XML document, the first time the abbreviation is used, as in the format <ns:property xmlns:ns="long_namespace_name">. Alternatively, as in the examples shown, a default namespace is defined for an XML document, as in the format <property xmlns="long_namespace_name">, and the namespace is implicit though not used throughout the XML. A property is specifically a name/value pair that contains descriptive information about a resource. More generally, a property is any information about a resource. Thus, properties provide for the ability to create, remove, and query such information about resources, such as their authors, creation dates, etc. Properties also provide for the ability to link web pages of any media type to other related web pages. A name space refers generally to the given space in which a resource is located. The scheme is a separated scheme because the property name is shown alone, whereas the full namespace name is shown separately.

The separated naming scheme of WebDAV, however, is not consistent with naming schemes used by other protocols and standards. For example, according to the Object Linking and Embedding Data Base (OLEDB) programming interface for data access, namespaces are not directly supported, so if the namespace is required to distinguish the property, it must be consistently appended to the beginning of the property name, as in the format "long_namespace_name#property", where property is the property name, and long_namespace_name: is the full namespace name, and # is an arbitrary separator character used to separate the two. OLEDB is specifically an object for use in the Component Object Model (COM) architecture to provide for data access of databases as well as other data sources. COM is a component software architecture that defines a structure for building program routines, referred to as objects, that can be called up and executed in operating system environments that support COM. OLEDB is described generally at the Internet web site //www.microsoft.com/data/oledb/ and at the Internet web site://www.microsoft.com/data/oledb/oledb20/. COM is described generally at the Internet web site //www.microsoft.com/com and at the Internet web site //www.microsoft.com/com/about.asp.

These different naming schemes are disadvantageous when both WebDAV and OLEDB are to be used to refer to the same data. OLEDB, for example, cannot process a property and a name space that is in accordance with the WebDAV naming scheme, while WebDAV cannot process a property and a name space that is in accordance with the OLEDB naming scheme. For these and other reasons, there is a need for the present invention.

SUMMARY OF THE INVENTION

The invention provides for translating property names and name space names between different naming schemes. In one embodiment, the concatenated format is considered the canonical format for describing a namespace/property pair. When a message is received that includes a separated namespace and property name, as in WebDAV, it is translated to the concatenated format for use. When a message is sent that must include a separated namespace and property name, the concatenated format is translated to the separated format. When a message is received that includes the concatenated namespace and property name, as in OLEDB, the concatenated format can be used directly.

The invention provides advantages not found in the prior art. In the context of OLEDB and WebDAV, the invention allows a OLEDB-centric application to access properties and name spaces specified in accordance with the separated naming scheme of WebDAV. Furthermore, the invention allows a WebDAV-centric application to access properties and name spaces specified in accordance with the concatenated naming scheme of OLEDB.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
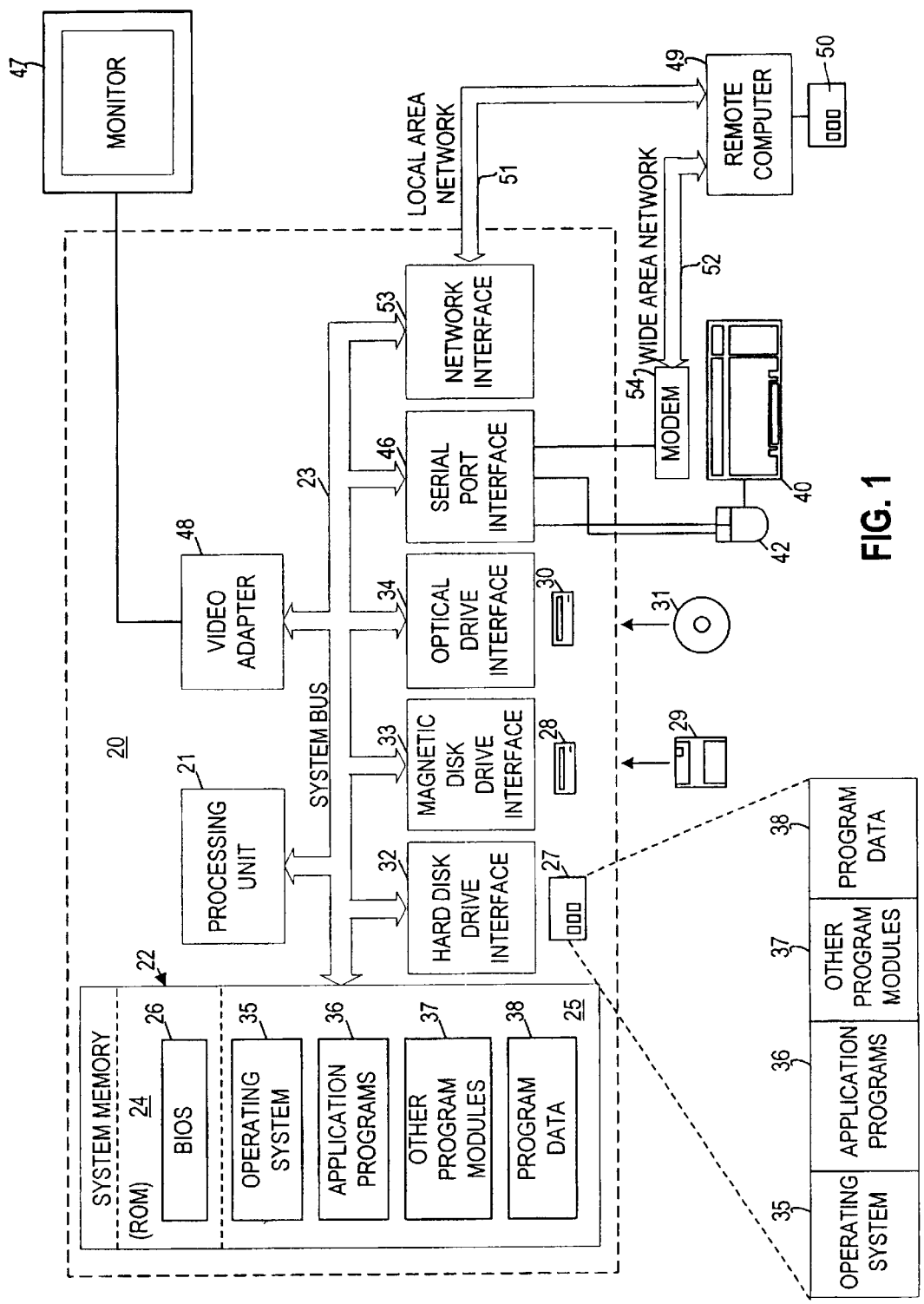
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

A Request Including a Header Specifying a Property and a Name Space

In this section of the detailed description, a request that includes a body specifying a property and a name space is described, according to varying embodiments of the invention. In further sections, methods, server architectures and systems according to embodiments of the invention are presented. The description is made in conjunction with the presentation of illustrative examples, according to WebDAV, OLEDB, XML and HTTP. While the examples are specific to WebDAV, OLEDB, XML and HTTP, the invention is not so limited. The first example is:

COMMAND url HTTP/1.1
Content-Type: text/xml
<myprop xmlns="mynamespace:">1</myprop>
<prop2>2</prop2>

In this example, there is an HTTP command COMMAND in the request. The command is against a target resource within a given space, where the location of the resource is specified by url. HTTP/1.1 specifies that the command is in accordance with the transport protocol HTTP, version 1.1. The Content-Type of text/xml specifies that the body of the command is in text format, according to the markup language XML. The resource specified has two properties "myprop" and "prop2", both of which are distinguished by the namespace "mynamespace:", which is the default namespace for the XML document. The example shows a value of "1" assigned to the property "myprop" and "2" assigned to "prop2".

The property and name space are within a body <myprop xmlns="mynamespace:">1</myprop><prop2>2</prop2> that is a part of the request, and that has a naming scheme specified by a separated naming scheme, specifically in the format of myprop xmlns="mynamespace:", or, more generally <property><space><word><equal sign><quote><name space><quote>, where <property> is the property name, <space> is the space character, <word> is a word such as "xmlns" signifying that an XML namespace is being defined, <equal sign> is the equal sign character, <quote> is the double-quote character, and <name space> is the name space name. The namespace may be defined immediately after the property when the property is first used, or earlier in the XML document. The <space><word> is also referred to as a string, such that the string separates the property from the name space (along with the equal sign, the space followed by the equal sign, and the quotation mark), and the string can be said to include a word surrounded by a space before and an optional space after. This separated naming scheme specifically is in accordance with the WebDAV naming scheme.

The second example is:

"mynamespace:myprop"

In this example, there is a header mynamespace:myprop that can be part of a request (not shown in the example), and that has a naming scheme specified by a concatenated naming scheme. The reference to the resource is not shown in this example. The namespace of the property is specified as mynamespace. The name of the property is specified as myprop. The property and name space are specified together specifically in the format of mynamespace:myprop, or, more generally <name space><property>, where <property> is the property name, and <name space> is the name space name. That is, generally, the property is concatenated with the name space such that no blank spaces, carriage returns, line feeds or other illegal characters separate the property and the name space. This concatenated naming scheme specifically is in accordance with the OLEDB naming scheme.

Going From a Concatenated Scheme to a Separated Scheme

In this section of the detailed description, the manner by which a property and a name space having a naming scheme according to a concatenated naming scheme is translated to having a naming scheme according to a separated naming scheme is described, according to one embodiment of the invention. The description is specific to WebDAV and OLEDB. However, the invention itself is not so limited.

The description is made according to the example mynamespace:myprop, which specifies the property named myprop within the name space named mynamespace:, according to a concatenated naming scheme consistent with OLEDB. It is desired to convert this example to myprop xmlns="mynamespace:". This latter example is according to a separated naming scheme consisted with WebDAV.

First, the last character of the example mynamespace:myprop is started at. The character is examined to determine whether it is a token character such as a colon (":"). If not, then the preceding character is examined, and the process continues until a token character is found. That is, the example is moved through character-by-character to the first character of the concatenation until a token character is found.

The token character signifies the last character of the name space. The invention is not limited to a particular token character; such token characters can include a colon (":"), a pound sign ("#"), as well as other characters. Thus, in the example, the token character ":" specifies the last character of the name space mynamespace:.

Next, the characters of the concatenation of the name space and the property from the first character of the concatenation up to and including the token character are said to specify the name space, while the characters of the concatenation from the next character after the token character up to and including the last character of the concatenation are said to specify the property. Thus, in the example, the name space is mynamespace:, and the property is myprop.

Once the name space has been separated from the property, the name space and the property are inserted according to a format specified by the separated naming scheme. In the case of WebDAV, this format is <property>xmlns="<name space>", where <property> specifies the property, and <name space> specifies the name space. Thus, in the example, insertion of the culled name space and property result in myprop xmlns="mynamespace:".

In one specific embodiment, before insertion is performed, it is determined if the last character of the name space consists of a predetermined special token character, such as the pound sign ("#"). If it does, then this character is removed from the name space inserted according to the format specified by the separated naming scheme. The invention is not so limited, however.

Going From a Separated Scheme to a Concatenated Scheme

In this section of the detailed description, the manner by which a property and a name space having a naming scheme according to a separated naming scheme is translated to having a naming scheme according to a concatenated naming scheme is described, according to one embodiment of the invention. The description is specific to WebDAV and OLEDB. However, the invention itself is not so limited.

The description is made according to the example myprop xmlns="mynamespace:", which is consistent with a WebDAV separated naming scheme, and which specifies the property named myprop within the XML name space named mynamespace:. It is desired to convert this example to mynamespace:myprop. This latter example is according to a separated naming scheme consistent with OLEDB.

Because the property and name space are separated, translation to a concatenated naming scheme involves concatenating the property to the name space. In the case of the example, this results in mynamespace:myprop. In one embodiment, if the name space does not terminate in a token character, such as those specified in the previous section of the detailed description, then a predetermined special token character, such as the pound sign ("#") is added to the name space prior to concatenating the property to the name space. Furthermore, in one embodiment, even if the last character of the name space consists of the predetermined special token character, another of this predetermined special token character is added to the name space prior to concatenating the property to the name space.

Methods

In this section of the detailed description, methods according to varying embodiments of the invention are described. The description is made with reference to FIG. 2, which is a flowchart of a computer-implemented method according to one embodiment of the invention. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The methods relate to providing data types for properties according to standard request-response protocols such as HTTP.

Figure 2:
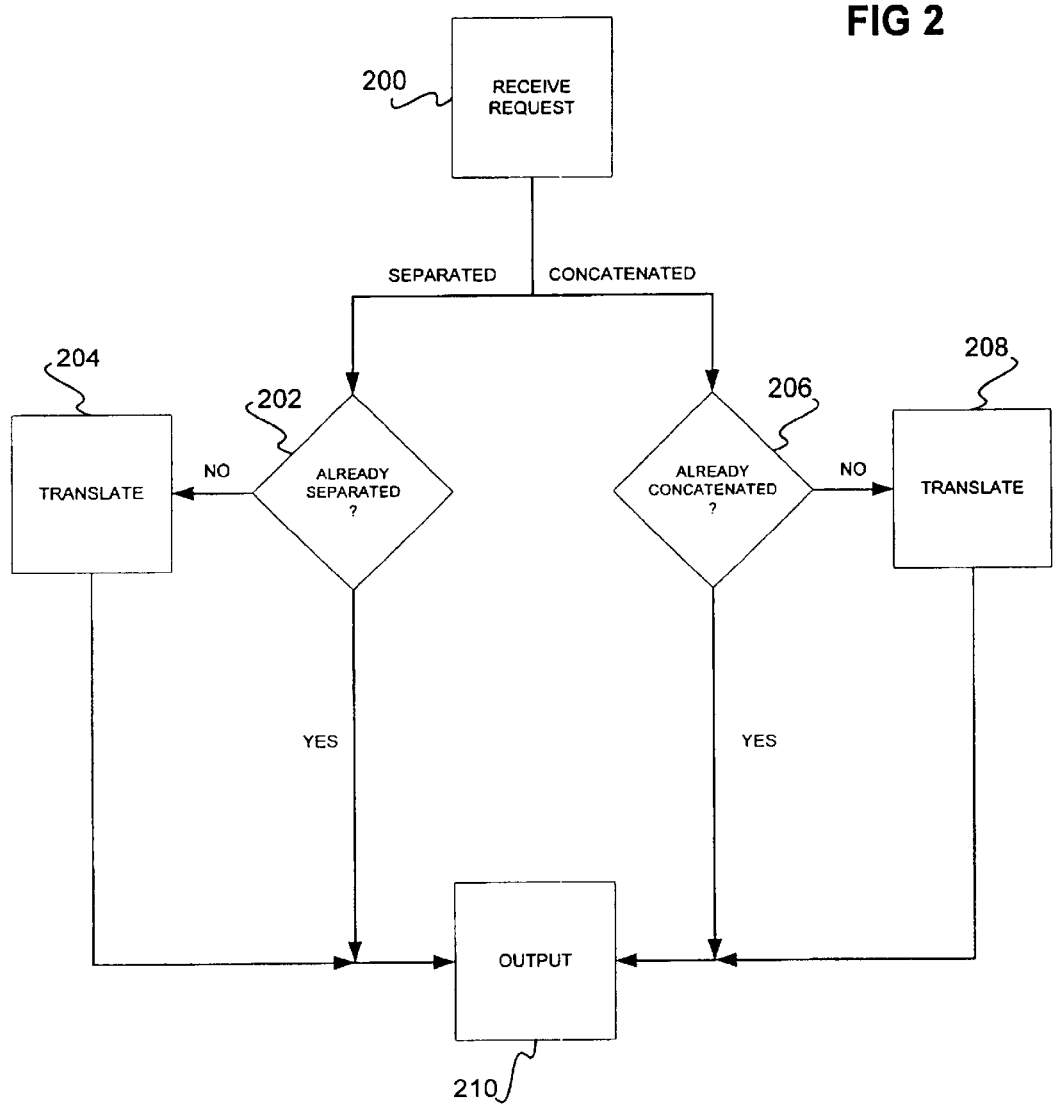
FIG. 2 is a flowchart of a method according to an embodiment of the invention; and, FIG. 3 is a diagram of a system according to an embodiment of the invention.

Referring now to FIG. 2, in 200, a request is received, which may include actually generating the request. The request includes a header specifying a property and a name space having a naming scheme according to either a concatenated naming scheme, such as is consistent with OLEDB, or a separated naming scheme, such as is consistent with XML. In one embodiment, the request is received by a server from a client over a network, such as an intranet, an extranet, or the Internet, according to a predetermined transport protocol such as HTTP and/or a predetermined markup language such as XML. The term "according to" as used in this last sentence is described later in this section of the detailed description.

Depending on whether the goal of the method is to have the request according to the separated or the concatenated naming scheme, the method proceeds to 202 or 206, respectively. In 202, it is determined if the header is already according to the separated naming scheme. If so, then the method proceeds to 210, as is described later in this section of the detailed description. If not, then the method proceeds to 204, where the header is translated to the separated naming scheme, as described in a preceding section of the detailed description. The method then proceeds to 210.

Similarly, in 206, it is determined if the header is already according to the concatenated naming scheme. If so, then the method proceeds to 210. If not, then the method proceeds to 208, where the header is translated to the concatenated naming scheme, as described in a preceding section of the detailed description. The method then proceeds to 210.

In 210, the request is output, according to a predetermined transport protocol and/or a predetermined markup language. In one embodiment, the protocol is HTTP, and the markup language is XML. As used herein, the phrase "according to" with respect to the transport protocol and/or the markup language refers to the request being per the transport protocol and the markup language. Outputting a request can in one embodiment include the submitting of the request from a client to a server over a network, such as an intranet, the Internet, or an extranet.

System

In this section of the detailed description, a description of a system according to an embodiment of the invention is provided. The description is made with reference to FIG. 3. Referring now to FIG. 3, the system thereof includes a client 300 and a server 302. Each of the client 300 and the server 302 can include a computer-readable medium, and a processor coupled thereto, and can be implemented as described already in conjunction with FIG. 1. The client 300 is communicatively coupled to the server 302 via a network 304, such as the Internet, an intranet, or an extranet.

The client 300 sends a request 306 according to a predetermined markup language such as XML and according to a predetermined transport protocol such as HTTP. In one embodiment, the request 306 is generated by an application or other computer program within the client 300 (not shown in FIG. 3), which is then passed onto the mechanism 310 for sending according to the markup language and the transport protocol. The mechanism 310 in one embodiment is a computer program executed by a processor of the client 300 from a computer-readable medium thereof. The request 306, for example, may be generated by the application according to a concatenated OLEDB naming scheme, such that the mechanism must also translate the request 306 according to a separated WebDAV naming scheme, which is then sent to the server 302. The request 306 thus includes a header specifying a property and a name space.

In response to receipt of the request 306, the server 302 sends a response 308 according to a predetermined markup language such as XML and according to a predetermined transport protocol such as HTTP. In one embodiment, the response is generated by an application or other computer program within the server 302 (not shown in FIG. 3), which is then passed onto the mechanism 312 for sending according to the markup language and the transport protocol. The mechanism 312 in one embodiment is a computer program executed by a processor of the server 302 from a computer-readable medium thereof. The request 306, for example, may be received by the server 302 according to a separated WebDAV naming scheme, which the mechanism 312 translates to a concatenated OLEDB naming scheme, so that the application can properly generate the response 308. The response 308 may also be according to a concatenated OLEDB naming scheme, which the mechanism 312 translates to a separated WebDAV naming scheme.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. In a computer system that processes messages comprising a name space and property pair, wherein some messages may be formatted in accordance with a concatenated naming scheme and other messages may be formatted in accordance with a separated naming scheme, a computer-implemented method that allows both a concatenated naming scheme application and a separated naming scheme application to refer to a single resource, which supports only one naming scheme, in accordance with each application's respective naming scheme, the method comprising:

receiving a request including a header specifying a property and a name space having a naming scheme according to either a concatenated naming scheme or a separated naming scheme;

if the request refers to a resource formatted in accordance with the concatenated naming scheme and the naming scheme of the header is according to the separated naming scheme, then translating the header so that the header has a naming scheme according to the concatenated naming scheme;

if the request refers to a resource formatted in accordance with the separated naming scheme and the naming scheme of the header is according to the concatenated naming scheme, then translating the header so that the header has a naming scheme according to a separated naming scheme; and, outputting the request including the header specifying the property and the name space.

2. The method of claim 1, wherein the concatenated naming scheme specifies the property being concatenated with the name space such that no characters separate the property and the name space.

3. The method of claim 2, wherein the concatenated naming scheme specifies the property being concatenated with the name space according to a format <namespace><property>, where <property> is the property, and <namespace> is the name space.

4. The method of claim 1, wherein the separated naming scheme specifies the property being separated from the name space by a string.

5. The method of claim 4, wherein the string comprises a word surrounded by a space character on each side.

6. The method of claim 5, wherein the word consists of "xmlns."

7. The method of claim 5, wherein the string further comprises an equal sign character followed by a space character.

8. The method of claim 7, wherein the separated naming scheme specifies the property being separated from the name space according to a format <property><space><word><space><equal sign><space><quote><name space><quote>, where <property> is the property, <space> is the space character, <word> is the word, <equal sign> is the equal sign character>, <quote> is a quote character, and <name space> is the name space.

9. The method of claim 1, wherein outputting the request comprises submitting the request according to a predetermined transport protocol and according to a predetermined markup language.

10. The method of claim 9, wherein the predetermined transport protocol comprises HTTP (HyperText Transport Protocol).

11. The method of claim 9, wherein the predetermined markup language comprises eXtensible Markup Language (XML).

12. The method of claim 1, wherein outputting the request comprises outputting the request the request over a network.

13. The method of claim 12, wherein the network comprises one of the Internet, an intranet, and an extranet.

14. The method of claim 1, wherein translating the header so that the header has a naming scheme according to a separated naming scheme upon determining that the naming scheme of the header is according to the concatenated naming scheme comprises:
   starting at a last character of a concatenation of the name space and the property;
   moving character-by-character to a first character of the concatenation until a token character is found that signifies a last character of the name space; and
   such that characters of the concatenation from the first character to and including the token character specify the name space, and characters of the concatenation from a next character after the token character to and including the last character specify the property.

15. The method of claim 14, translating the header so that the header has a naming scheme according to a separated naming scheme upon determining that the naming scheme of the header is according to the concatenated naming scheme further comprises removing the last character of the name space upon determining that the last character consists of a predetermined special token character.

16. The method of claim 1, wherein translating the header so that the header has a naming scheme according to the concatenated naming scheme upon determining that the naming scheme of the header is according to the separate naming scheme comprises concatenating the property to the name space.

17. The method of claim 16, wherein translating the header so that the header has a naming scheme according to the concatenated naming scheme upon determining that the naming scheme of the header is according to the separate naming scheme further comprises adding a predetermined special token character to the name space prior to concatenating the property to the name space upon determining that a last character of the name space does not consist of a token character.

18. The method of claim 16, wherein translating the header so that the header has a naming scheme according to the concatenated naming scheme upon determining that the naming scheme of a header is according to the separate naming scheme further comprises adding a predetermined special token character to the name space prior to concatenating the property to the name space upon determining that a last character of the name space does not consist of a token character unequal to the predetermined special token character.

19. In a computer system that processes messages comprising a name space and property pair, wherein some messages may be formatted in accordance with a concatenated naming scheme and other messages may be formatted in accordance with a separated naming scheme, a machine-readable medium having instructions stored thereon for execution by a processor to perform a method that allows both a concatenated naming scheme application and a separated naming scheme application to refer to a single resource, which supports only one naming scheme, in accordance with each application's respective naming scheme, the method comprising:
   receiving a request including a header specifying a property and a name space having a naming scheme according to either a concatenated naming scheme or a separated name scheme;
   if the request refers to a resource formatted in accordance with the concatenated naming scheme and the naming scheme of the header is according to the separated naming scheme, then translating the header so that the header has a naming scheme according to the concatenated naming scheme;
   if the request refers to a resource formatted in accordance with the separated naming scheme and the naming scheme of the header is according to the concatenated naming scheme, translating the header so that the header has a naming scheme according to a separated naming scheme; and,
   outputting the request including the header specifying the property and the name space.

20. The medium of claim 19, wherein translating the header so that the header has a naming scheme according to a separated naming scheme upon determining that the naming scheme of the header is according to the concatenated naming scheme comprises:
   starting at a last character of a concatenation of the name space and the property;
   moving character-by-character to a first character of the concatenation until a token character is found that signifies a last character of the name space; and
   such that characters of the concatenation from the first character to and including the token character specify the name space, and characters of the concatenation from a next character after the token character to and including the last character specify the property.

21. The medium of claim 20, translating the header so that the header has a naming scheme according to a separated naming scheme upon determining that the naming scheme of the header is according to the concatenated naming scheme further comprises removing the last character of the name space upon determining that the last character consists of a predetermined special token character.

22. The medium of claim 19, wherein translating the header so that the header has a naming scheme according to the concatenated naming scheme upon determining that the naming scheme of the header is according to the separate naming scheme comprises concatenating the property to the name space.

23. The medium of claim 22, wherein translating the header so that the header has a naming scheme according to the concatenated naming scheme upon determining that the naming scheme of the header is according to the separate naming scheme further comprises adding a predetermined special token character to the name space prior to concatenating property to the name space upon determining that a last character of the name space does not consist of a token character.

24. The medium of claim 22, wherein translating the header so that the header has a naming scheme according to the concatenated naming scheme upon determining that the naming scheme of the header is according to the separate naming scheme further comprises adding a predetermined special token character to the name space prior to concatenating the property to the name space upon determining that a last character of the name space does not consist of a token character unequal to the predetermined special token character.

25. A computerized system comprising:
one or more clients with a plurality of client applications, wherein at least one client application generates requests that include a header specifying a property and a name space having a naming scheme according to a separated naming scheme, and wherein at least one other client application generates requests that include a header specifying a property and a name space having a naming scheme according to a concatenated naming scheme;
one or more servers, communicatively coupled to the one or more clients, with a plurality of server resources, wherein at least one server resource is formatted in accordance with the separated naming scheme, and wherein at least one other server resource is formatted in accordance with the concatenated naming scheme; and,
one or more mechanisms, communicatively coupled to the plurality of clients and the plurality of servers, that translate requests into the concatenated naming scheme for the at least one server resource that is formatted in accordance with the concatenated naming scheme („or the at least one separated naming scheme client application), and that translates requests into the separated naming scheme for the at least one server resource that is formatted in accordance with the separated naming scheme (or the at least one concatenated naming scheme client application).

26. The system of claim 25, wherein at least one of the server and the client comprise a computer-readable medium and a processor coupled thereto.

27. The system of claim 25, further comprising a network, such that the server is communicatively coupled to the client over the network.

28. The system of claim 25, wherein the predetermined markup language comprises eXtensible Markup Language (XML), and the predetermined transport protocol comprises HTTP (HyperText Transport Protocol).

29. The method of claim 1, wherein the separate format, the namespace used is unequal to the default namespace, such that the namespace is assigned an abbreviation to be used throughout an XML document.

* * * * *